United States Patent
Lowry

(10) Patent No.: US 8,099,085 B2
(45) Date of Patent: Jan. 17, 2012

(54) METHOD AND SYSTEM FOR COMMUNICATING WITH USERS OF WIRELESS DEVICES WHEN APPROACHING A PREDETERMINED DESTINATION

(75) Inventor: Sadie Lowry, Atlanta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 710 days.

(21) Appl. No.: 11/623,346

(22) Filed: Jan. 16, 2007

(65) Prior Publication Data

US 2008/0169937 A1 Jul. 17, 2008

(51) Int. Cl.
| | |
|---|---|
| H04M 3/42 | (2006.01) |
| H04M 3/493 | (2006.01) |
| H04L 29/06 | (2006.01) |
| H04W 24/00 | (2009.01) |
| G08B 1/08 | (2006.01) |
| G08G 1/123 | (2006.01) |

(52) U.S. Cl. ............... 455/414.1; 455/414.2; 455/414.3; 455/456.1; 340/539.13; 340/539.23; 340/994

(58) Field of Classification Search ............... 455/412.2, 455/414.1–414.3, 433, 456.1; 340/539.13, 340/539.23, 994

See application file for complete search history.

(56) References Cited

U.S. PATENT DOCUMENTS

| | | | | |
|---|---|---|---|---|
| 6,124,810 | A * | 9/2000 | Segal et al. ................... | 340/994 |
| 6,360,102 | B1 * | 3/2002 | Havinis et al. ................ | 455/457 |
| 6,683,542 | B1 * | 1/2004 | Jones ........................... | 340/994 |
| 6,700,506 | B1 * | 3/2004 | Winkler et al. ............... | 340/994 |
| 6,823,188 | B1 * | 11/2004 | Stern ........................... | 455/456.1 |
| 6,980,131 | B1 * | 12/2005 | Taylor ........................... | 340/994 |
| 7,030,781 | B2 * | 4/2006 | Jones ........................... | 340/994 |
| 7,035,731 | B2 * | 4/2006 | Smith ........................... | 701/207 |
| 7,064,681 | B2 * | 6/2006 | Horstemeyer ................ | 340/994 |
| 7,149,504 | B1 * | 12/2006 | Weaver et al. ............. | 455/414.2 |
| 7,191,058 | B2 * | 3/2007 | Laird et al. ................... | 701/204 |
| 7,319,414 | B2 * | 1/2008 | Horstemeyer ................ | 340/994 |
| 7,479,899 | B2 * | 1/2009 | Horstemeyer ................ | 340/994 |
| 7,479,901 | B2 * | 1/2009 | Horstemeyer ................ | 340/994 |
| 7,561,069 | B2 * | 7/2009 | Horstemeyer ................ | 340/994 |
| 2005/0184907 | A1 * | 8/2005 | Hall et al. ..................... | 342/387 |
| 2005/0221806 | A1 * | 10/2005 | Sengupta et al. ............ | 455/414.3 |
| 2006/0237531 | A1 * | 10/2006 | Heffez et al. ................. | 235/382 |
| 2007/0010941 | A1 * | 1/2007 | Marsh ........................... | 701/209 |
| 2007/0015495 | A1 * | 1/2007 | Winter et al. ............... | 455/414.1 |
| 2007/0082680 | A1 * | 4/2007 | Fish ............................ | 455/456.1 |

\* cited by examiner

*Primary Examiner* — Marivelisse Santiago Cordero
*Assistant Examiner* — Mong-Thuy Tran
(74) *Attorney, Agent, or Firm* — Parks IP Law LLC; Mickki D. Murray, Esq.

(57) ABSTRACT

Using cell phones or other wireless devices to notify users of those devices of impending arrival at a selected customer location. The current location of the wireless device is determined and compared with the known location of the destination. When the wireless device is within a predetermined distance or at a predetermined estimated arrival time from the selected destination, an alert is sent to the wireless device and, if authorized, an alert also is sent to the destination. In response to the impending arrival, the destination may provide information for the user concerning offerings at that destination.

20 Claims, 3 Drawing Sheets

METHOD AND SYSTEM FOR COMMUNICATING WITH USERS OF WIRELESS DEVICES WHEN APPROACHING A PREDETERMINED DESTINATION

BACKGROUND OF THE INVENTION

This invention relates in general to communication with wireless devices, and relates in particular to alerting the user of a wireless device when the user is within predetermined range of a particular destination.

Convenience is an ever increasing factor in the lives of many persons. People running errands or commuting have little time or patience to deal with unnecessary tasks. Much time spent on errands often is wasted waiting in line, for example, to give a drycleaner or other business establishment a claim ticket and then wait while the appropriate product is retrieved, or to place a to-go order at a restaurant and then wait while the order is prepared. Although the amount of delay encountered for each such task may seem small in itself, the cumulative amount of those times may loom large and irritate those who are running on a tight schedule.

With the popularity and general acceptance of cellular phones and other wireless communication devices, a person possibly could call or send a text message alerting his or her impending arrival to an intended destination. That possibility becomes more difficult in actual practice, as it requires the user in advance to add telephone numbers or e-mail addresses of vendors or other destinations visited by that user. The user then would need to remember to alert each intended destination, preferably with sufficient advance notice for someone at each destination to retrieve an order or otherwise prepared for the arrival of that customer. Even if that person timely remembered to notify vendors of an impending arrival, using a cell phone or other wireless device to place those notices, including searching for the phone number or other electronic address of each intended destination while driving, may detract that person's attention from driving and thus may present a hazard. In that regard, some jurisdictions are restricting the use of cell phones or other handheld devices by vehicle operators, making it problematic at best for a person to provide advance notice by placing a cell while en route to pick-up or place an order.

SUMMARY OF THE INVENTION

Stated in general terms, the present invention notifies the user of a wireless device when that device is within a predetermined proximity to at least one entity selected by that user. The user of the wireless device thus then may send or cause to be sent an alert message to that destination, alerting the destination that a particular person or customer is approaching that destination. The user of the wireless device preferably, but not necessarily, has the option to approve sending a proximity alert to the selected destination, or may instead opt for a service in which the alert is automatically sent to the destination in response to determining the user's proximity to that destination.

The actual location of the user's cell phone or other appropriate wireless device carried by the user is determined by any suitable technique known to those skilled in the art. One such technique for locating a cellular phone is time-difference-of-arrival measurement based on signals transmitted by the cell phone and received at multiple cell-phone base stations. Other known methods to locate a wireless device include a GPS (Global Positioning System) receiver-equipped cell phone that monitors and records the geographic location of the cell phone and periodically transmits that location information to a cellular service provider. Various techniques for providing geographic location information of cell phones and other wireless devices are described, for example in U.S. Pat. No. 7,110,749, the contents of which are incorporated herein by reference.

The present invention also contemplates sending an alert to the user's wireless device with a lead time approximately equal to an estimated time required for the user to arrive at the selected destination or otherwise based on the estimated travel time. Because that estimated time of arrival will depend on factors including the velocity of the wireless device, which is readily calculated from the location information available for that device, and by other variables such as available routing between the present location of the device and the intended destination, those variables may determine an estimated lead time for sending an alert message to the wireless device and to the intended destination. The nature of the intended destination or the intended purpose of the user's visit to a particular destination may also determine the amount of lead time. For example, relatively little lead time may be required before the user arrives at a drycleaner. A greater amount of time would likely be required if the user is heading to pick-up prepared food, such as a pizza or another takeout order requested or pre-approved by the user.

Providing advance notice of customer arrivals gives the vendor or other destination an opportunity to prepare for that arrival, thereby reducing the customer's wait time and increasing customer satisfaction. Thus, the drycleaner could fetch the user's cleaning previously dropped off, and could also charge the cost of that cleaning to a credit card or other payment technique previously authorized by the customer, subject to approval when the customer arrives and picks up the cleaning. Such advance notice thus saves time and provides greater convenience both for the user and the vendor.

Other systems, methods, or computer program products according to embodiments will be or become apparent to one with skilled in the art upon review of the following drawings and detailed description. It is intended that all such additional systems, methods, and/or computer program products be included within this description, be within the scope of the present invention, and be protected by the accompanying claims.

DETAILED DESCRIPTION OF DISCLOSED EMBODIMENT

Figure 1:
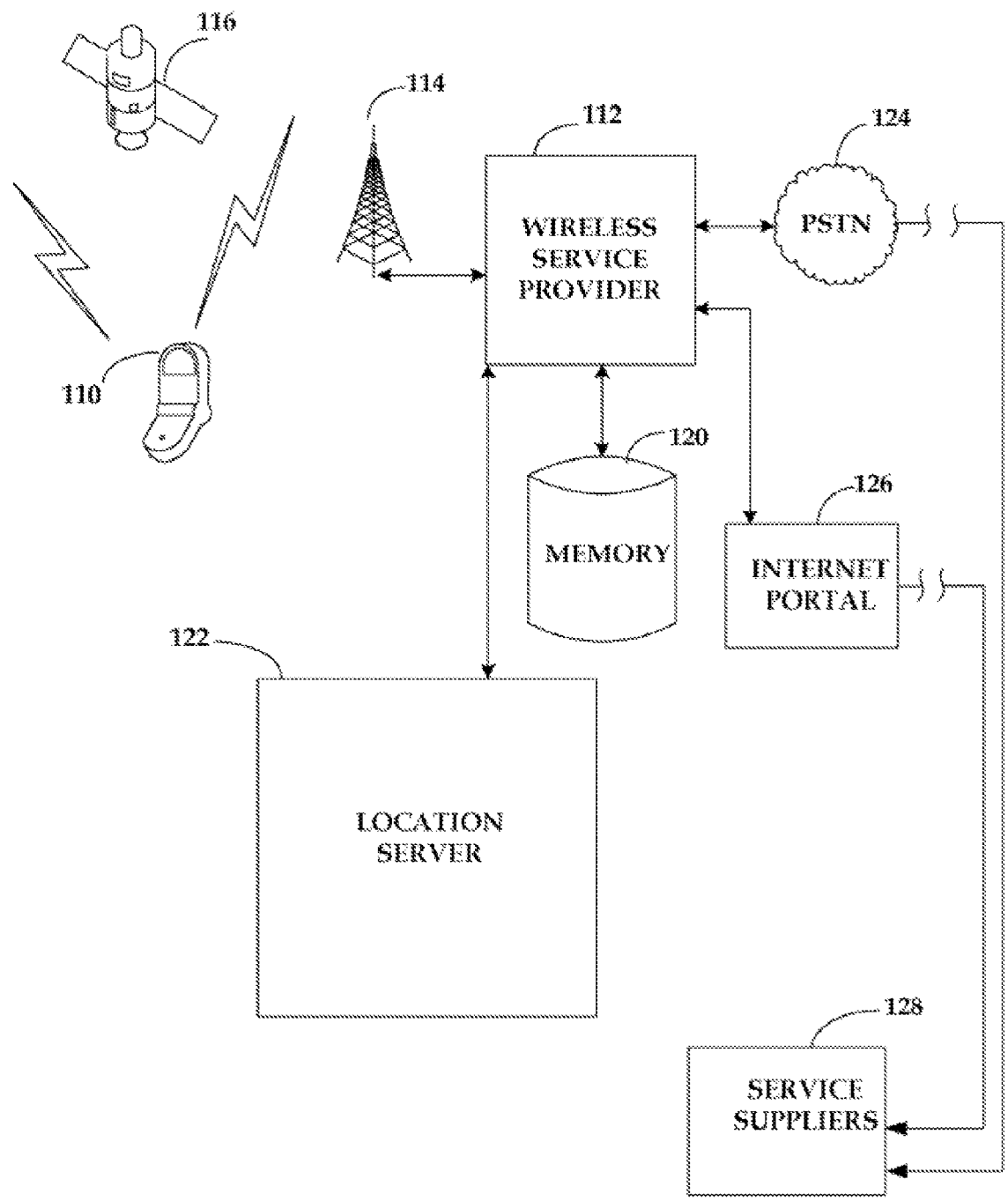
FIG. 1 is a block diagram showing apparatus for implementing a disclosed embodiment of the present invention.

FIG. 1 illustrates typical interaction between a wireless device, such as a cell phone 110, and a wireless network 112 including a number of cell sites collectively designated at 114. The cell phone 110 includes a display screen and a keypad, as is customary. Furthermore, the cell phone 110 may be equipped with a built-in GPS receiver for receiving transmissions from GPS satellites collectively indicated at 116. The nature and operation of the GPS system is known to those skilled in the art and is not further discussed herein. (Although the present embodiment is discussed in the context of GPS-enabled cell phones communicating with a cellular wireless network, it should be understood that other wireless devices such as PDAs capable of text messaging, or of both text and voice messaging, may be employed in place of or alongside the cellular network including cellular phones 110).

The wireless service provider 112 is in radio communication with each cell phone 110 or other wireless device within range of the network of cell sites 114. The wireless service provider 112 obtains geographic location information from the cell phones 110, either from GPS information obtained by a GPS-equipped cell phone or through other geolocation techniques known in the art. This location information of the cell phones 10 is stored in a memory 120 associated with the wireless service provider 112 and is programmed as described herein to communicate with the cell phones 110 and service suppliers according to the embodiment described herein.

The wireless service provider 112 connects to the public switched telephone network (PSTN) 124 for communication with other telephone devices available on that network. The wireless service provider 112 may also connect to the Internet portal 126. Both the Internet portal 126 and the PSTN 124 may communicate with destination entities that have opted for proximity alerts according to the present invention. Those destination entities are collectively identified in FIG. 1 as service providers 128. A "service provider" may be any provider of goods or services that has opted to participate with the users of wireless devices in a program for receiving advance notice of impending customer arrivals.

Figure 2A:
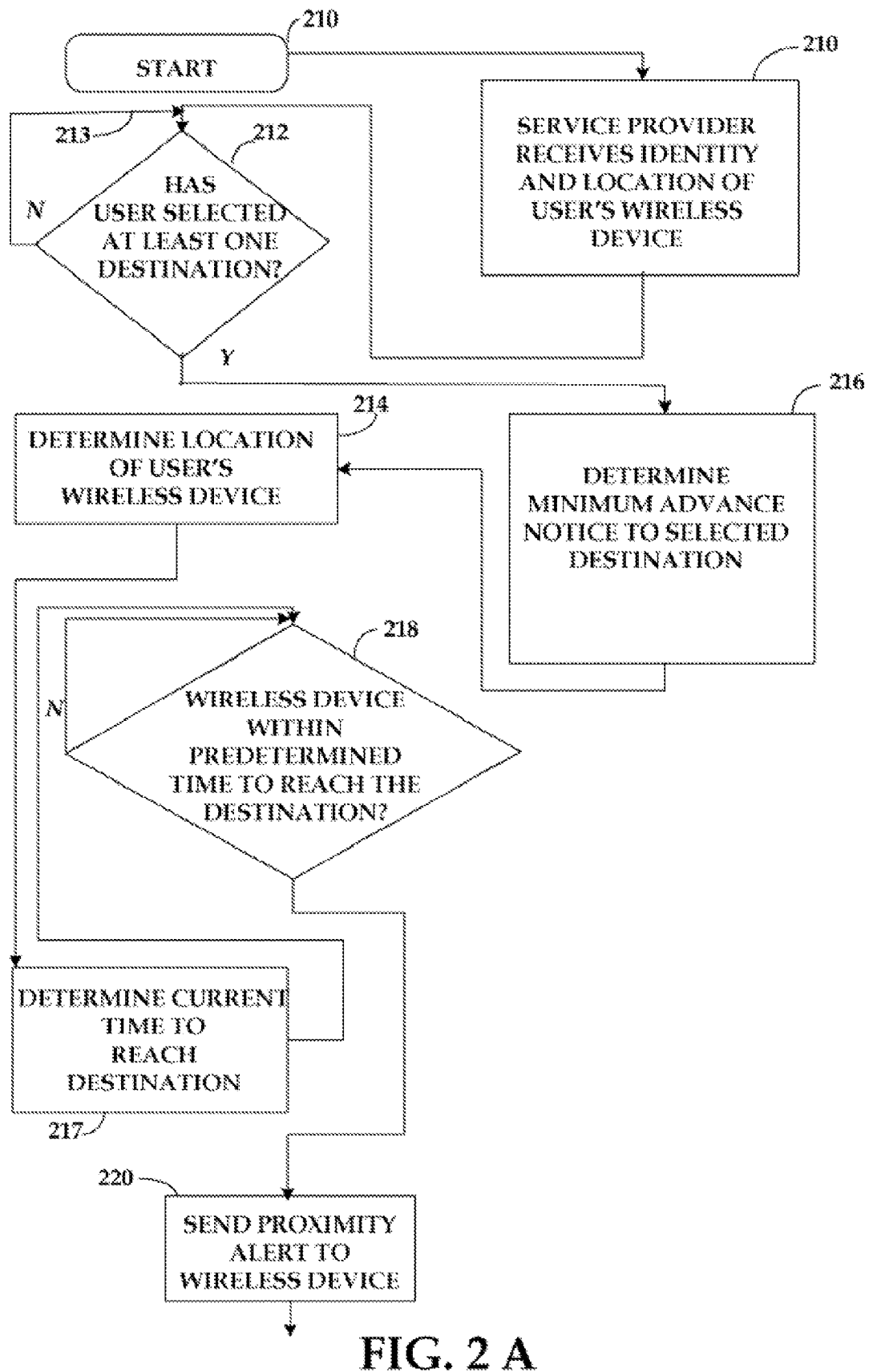
FIGS. 2A and 2B contain a flow chart illustrating a method according to the disclosed embodiment of the present invention.
Figure 2B:
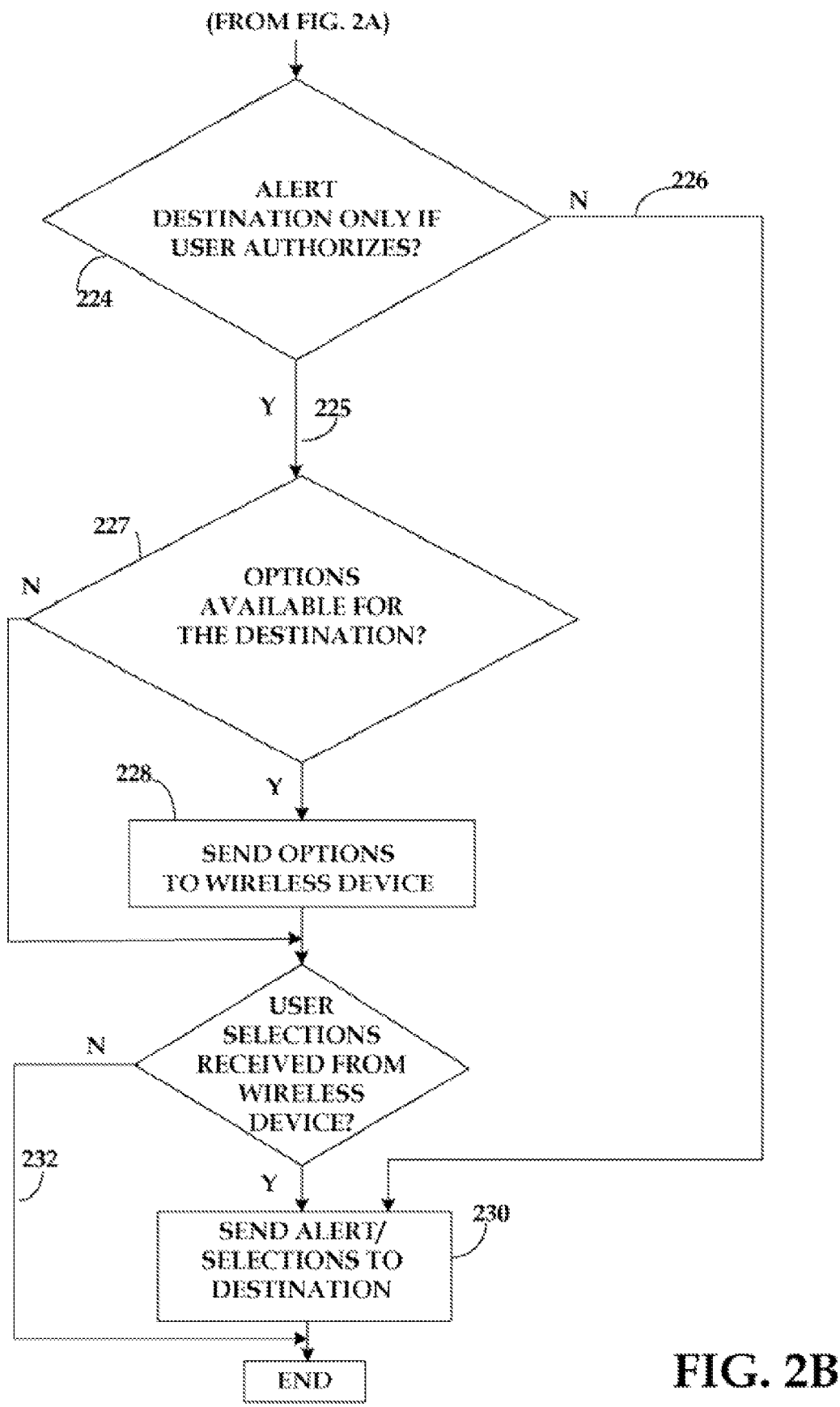

FIGS. 2A and 2B depict certain operational elements of location-based notification according to the disclosed embodiment of the present invention. For the following discussion, it should be understood that at least one service provider at a known destination and at least one user of a wireless device have chosen to participate in the present location-based notification. A service provider, which for the disclosed embodiment is assumed to be a retail outlet such as a drycleaner or a restaurant, would opt to participate by agreement with a provider of the location-based notification service. That provider might be a local network-based service provided such as the wireless service provider 112 or a local wireline telephone service provider, or may be a third party service provider in a cooperative relation with a provider of telephone network services. In any case, a participating service provider or destination entity would provide identifying information such as the name and geographic address of the entity, and a preferred messaging address such as a telephone number, and/or an address for e-mail or text messaging, or another preferred electronic address for receiving messages indicating the imminent arrival of a customer. Depending on the nature of the service provided at a particular destination, that destination entity might also desire to initiate two-way communication with its arriving customers. For example, a restaurant, upon receiving notice that a preferred customer will soon arrive, may wish to respond by messaging that customer with information such as special menu items currently available, or may ask whether the customer wants to place a repeat order of items previously obtained from that destination. In such cases, the destination would require the capability of two-way message communication with its arriving customers, for example, through e-mail or text-messaging apparatus accessible at the destination or by placing a voice call to the user.

Users of cell phones or other wireless devices wishing to participate in the location-based notification of their impending arrival at participating destinations, also will subscribe or otherwise enroll with the service provider. Each participating user would need to enter identification information of his or her wireless device, including the electronic identification number or other unique information identifying the user's wireless device to the service provider and, in the case of a cell phone, the phone number assigned to that phone. Each individual user, when subscribing to the location-based notification feature, may also enter his or her preferred destinations for arrival notification, and whether the user prefers to notify those destinations by default when impending arrival is determined or only after notice to sent the user followed by authorization received from the user. Users desiring to enter such location-based service could do so, for example, either through their cell phone or other wireless device, or by visiting a Web-based online site made available for that purpose by the provider of the location-based service.

Turning now to FIG. 2A, location-based notification of a destination commences at 210 as the user's wireless service provider 112 periodically receives information concerning the identification and the location of that user's wireless device. As mentioned hereinabove, that location information may be obtained by expedients such as a GPS-equipped cell phone, or in the alternative by known methods associated with the cellular network. If the user's wireless device is GPS-enabled, the wireless device itself can provide that information to the service provider. It should be understood that location information of a subscribing user's wireless device should be periodically transmitted to or obtained by the service provider, whereupon the service provider can compare that location information with the geographic location of one or more destinations subscribing to the notification system and previously selected by the particular user as indicated at 212 in FIG. 2. If the user has not selected at least one destination for location-based notification, then as indicated at 213 the notification process effectively ends until the user selects a destination for notification.

Selecting a particular destination for location-based notification also determines a minimum amount of time for advance notice desired by that destination, as indicated at 216. That advance notice may be determined by the nature of the destination to which the wireless device is headed. Some destinations typically require relatively little time to prepare for arrival of a particular customer. For example, a drycleaner might require no more than one or two minutes to retrieve a particular customer's cleaning, once the cleaner receives an alert for the impending arrival of that customer. Employees of the drycleaner can then fetch that customer's order and position the order for pick-up by the customer, such as at the front counter or at a drive-through window of the cleaner. In such a case, setting a minimum advance-notice time for two minutes at 216 for the proximity alert might be appropriate, so that the system would send a proximity alert to the user's wireless device two minutes before the user's predicted arrival at that destination.

However, other destinations subscribing to the present location-based notification service might require or prefer a greater amount of time to prepare for arrival of at least some customers. For example, a restaurant frequented by the arriving customer may want notification with enough time to prepare a table for that customer, or even to commence preparing a meal favored or selected by the particular customer. In such cases, the proximity-based alert would take place earlier, as determined by the advance-notice time set at 216. As a further example, a restaurant chain having facilities located at certain exits along an interstate highway might want participating wireless-device users to receive notice before the user arrives at a particular exit. The amount of the preferred advance notice would typically be determined by each participating destination, at the time that destination signs up for location-based notification.

Determining the present location of the wireless device is illustrated in FIG. 2A at 214. That location is used at 217 to estimate the current time required to arrive at one or more destinations previously selected by the user for location-based notification. Determining what constitutes an estimated "time of arrival" typically requires, at a minimum, the present location and speed of the user's wireless device and the previously-entered geographic location information for a particular destination. In some situations, those two location points alone may not provide an accurate or real-world estimate for the user's time of arrival at the particular destination. The speed at which the user is moving is one factor affecting the user's estimated time of arrival at the destination. The available routes for traveling to the destination from the user's present location is another variable that may be considered in estimating the arrival time. For example, mapping programs known to the art may be incorporated into the software at the location server 122, to estimate the time required for a user traveling at a present speed (known from periodic changes in the user's current location) and the distance required to travel along an available route to the location of the destination. That predetermined time of arrival provides an input to determine whether the user's wireless device is presently located within the predetermined minimum advance time to reach the destination, as shown at 218. If the user's wireless device has reached a point where the predicted time for arrival is not more than the minimum advance notification for that destination, the method at 220 causes the system operator to send an appropriate message to the wireless device, notifying the user of the impending arrival at the particular location.

After the system operator sends a proximity alert to the wireless device concerning a particular destination as at 220, the method may also send an alert to that destination as at 224 in FIG. 2B. The destination alert may be sent only if the user has opted for prior approval, and that approval typically is indicated by the user returning an appropriate authorization message to the system operator as indicated at 225. However, if the user, by selection or by default, previously approved sending an automatic notification to the destination when the user's wireless device is at a predetermined estimated time of arrival, then the system at 226 sends that alert message to the destination as at 226. That automatic alert to the destination ends the location-based notification according to the embodiment shown in FIG. 2.

The proximity alert sent at 220 to the wireless device preferably includes an indication of the particular destination being approached, and may also include the estimated arrival time at that destination based on factors including the user's current location and speed of travel. With that information displayed on the screen of the user's cell phone or other wireless device, the user can decide whether to authorize sending an authorization to alert that destination, and the display may remind the user of the need to visit the destination. Furthermore, if the particular destination is one that has elected to offer its arriving customers advance notice of options, such as special menu items or selections based on that user's past orders, the system provider sends those options to the user's wireless device as indicated at 228. In the case of destination-based options that change from time to time, e.g. menu items, the destinations may update that option information to the provider of the location-based notification service. In the alternative, when the service provider receives an authorization at 225 to alert a particular destination, the service provider may determine at 227 whether that destination has elected to offer user options and, if so, may at that time send a message to the destination seeking any available update information. That query could also identify the particular arriving user, as that user at 224 has previously authorized alerting the destination.

If options for the particular user are available, the system operator sends those options to the wireless device at 228. The user may then select an available option and communicate directly with the destination, or may instead send a return message to the system operator authorizing the selection message to the destination, in either case as indicated at 230 in FIG. 2. The system operator then sends the appropriate message to the destination, with or without the user's choice of options if previously received from the user, ending the location-based notification. However, if no message is received from the wireless device in response to the availability of options, then at 232 the method ends without sending the destination any alert or other information concerning the impending arrival of that user.

It should be understood that the foregoing relates only to a disclosed embodiment of the present invention, and that numerous modifications and alterations thereto may be made without departing from the spirit and scope of the invention as defined in the following claims.

What is claimed is:

1. A method, for communicating with a user of a wireless communication device, comprising:
   determining that the wireless communication device is separated from a known location of a selected entity by a pre-determined distance, in a determination act, wherein the predetermined distance is a positive, non-zero, value;
   sending, in response to the determination act, a proximity alert to the wireless communication device while it is en route to and approaching the selected entity, prior to the wireless communication device arriving at the selected entity, wherein the proximity alert indicates that the wireless communication device is separated from the known location of the selected entity by the predetermined distance;
   receiving, from the wireless communication device, while it is en route to and approaching the selected entity, and in response to the proximity alert sent to the wireless communication device, an express authorization communication authorizing sending of an alert to the selected entity advising the selected entity of the impending arrival of the wireless communication device to the selected entity; and
   sending an alert to the selected entity only in response to:
      the determination act; and
      receiving the express authorization communication from the wireless communication device, while the wireless communication device is en route to and approaching the selected entity, thereby giving the user an option to not send an alert to the selected entity.

2. The method of claim 1, further comprising:
   determining a speed at which the wireless communication device is moving in relation to the known location;
   determining an estimated time of arrival of the wireless communication device to the known location, based on the speed of the wireless communication device on its way toward the selected entity, a location of the wireless communication device, and available routing between the location of the wireless communication device and the known location of the selected entity;
   wherein at least one of (i) sending the alert to the selected entity and (ii) sending the proximity alert to the wireless communication device is performed at a time determined as a function of the estimated time of arrival.

3. The method of claim 2, further comprising:
sending to the wireless communication device a message concerning an offer from the selected entity for consideration by the user;
receiving from the wireless communication device a response to the offer from the selected entity; and
forwarding the response to the selected entity when the estimated time to arrive at the known location bears a predetermined relation to a known amount of time for the selected entity to prepare for the arrival of the user.

4. The method of claim 1, wherein the proximity alert is sent to the wireless communication device at a time based on an estimated time it would take for the user to arrive at the known location at a current speed of the wireless communication device.

5. The method of claim 4, further comprising:
determining an amount of time needed for the selected entity to prepare for a visit by the user; and
sending the proximity alert to the user when the estimated travel time is equal to or less than a time for preparation so that the selected entity is alerted in time sufficient to prepare for the visit by the user.

6. The method of claim 1, wherein the alert sent to the selected entity is the proximity alert.

7. The method of claim 1, further comprising:
determining a present location of the wireless communication device;
comparing the present location of the wireless communication device with the known location of the entity, which was selected by the user of the wireless communication device, to determine whether the wireless device is within the predetermined distance from the known location of the selected entity; and
producing the proximity alert in response to determining that the wireless communication device is within the predetermined distance of the known location of the selected entity.

8. The method of claim 1, wherein:
the express authorization communication is initiated by the user of the wireless communication device in response to receiving the proximity alert; and
the option, to not send an alert to the selected entity, is given to the user when the user receives the alert.

9. A non-transitory computer-readable medium, for communicating with a user of a wireless communication device, containing instructions, executable by a processor to perform a method comprising:
determining that the wireless communication device is separated from a known location of a selected entity, in a determination act, by less than a pre-determined distance, wherein the predetermined distance is a positive, non-zero, value;
sending, in response to the determination act, a proximity alert to the wireless communication device while it is en route to and approaching the selected entity, prior to the wireless communication device arriving at the selected entity, wherein the proximity alert indicates that the wireless communication device is separated from the known location of the selected entity by the predetermined distance;
receiving, from the wireless communication device, while it is en route to and approaching the selected entity, and in response to the proximity alert sent to the wireless communication device, an express authorization communication authorizing sending of an alert to the selected entity advising the selected entity of the impending arrival of the wireless communication device to the selected entity; and
sending an alert to the selected entity only in response to:
the determination act; and
receiving the express authorization communication from the wireless communication device, while the wireless communication device is en route to and approaching the selected entity, thereby giving the user an option to not send an alert to the selected entity.

10. The computer-readable medium of claim 9, the method further comprising:
determining a speed at which the wireless communication device is moving in relation to the known location; and
determining an estimated time of arrival of the wireless communication device to the known location, based on the speed of the wireless communication device on its way toward the selected entity, a location of the wireless communication device, and available routing between the location of the wireless communication device and the known location of the selected entity; wherein at least one of (i) sending the alert to the selected entity and (ii) sending the proximity alert to the wireless communication device is performed at a time determined as a function of the estimated time of arrival.

11. The computer-readable medium of claim 10, the method further comprising:
sending to the wireless communication device a message concerning an offer from the selected entity for consideration by the user;
receiving from the wireless communication device a response to the offer from the selected entity; and
forwarding the response to the selected entity when the estimated time of arrival at the known location bears a predetermined relation to a known amount of time for the selected entity to prepare for the arrival of the user.

12. The computer-readable medium of claim 9, wherein the proximity alert is sent to the wireless communication device at a time based on an estimated time it would take for the user to arrive at the known location at a current speed of the wireless communication device.

13. The computer-readable medium of claim 12, the method further comprising:
determining an amount of time needed for the selected entity to prepare for a visit by the user; and
sending the proximity alert to the user when the estimated travel time is equal to or less than a time for preparation so that the selected entity is alerted in time sufficient to prepare for the visit by the user.

14. The computer-readable medium of claim 9, wherein the method further comprises:
determining a present location of the wireless communication device;
comparing the present location of the wireless communication device with the known location of the entity, which was selected by the user of the wireless communication device, to determine whether the wireless device is within the predetermined distance from the known location of the selected entity; and
producing the proximity alert in response to determining that the wireless communication device is within the predetermined distance of the known location of the selected entity.

15. The computer-readable medium of claim 9, wherein the alert sent to the selected entity is the proximity alert.

16. A system, for communicating with a user of a wireless communication device, comprising:
a computing device programmed to:
compare, in a comparison act, a present location of the wireless communication device and a known location of an entity selected by the user of the wireless communication device to determine whether the wireless device is separated by a predetermined distance from the known location of the selected entity, wherein the predetermined distance is a positive, non-zero, value;
determine, in response to the comparison act, that the wireless communication device is separated from known location of the selected entity by the predetermined distance, in a determination act;
produce a proximity alert when the present location is within the predetermine distance of the known location of the selected entity, the proximity alert indicating that the wireless communication device is within the predetermined distance;
send, in response to the determination act, the proximity alert to the wireless communication device while it is en route to and approaching the selected entity, prior to the wireless communication device arriving at the selected entity, wherein the proximity alert indicates that the wireless communication device is separated from the known location of the selected entity by the predetermined distance;
receive, from the wireless communication device, while it is en route to and approaching the selected entity, and in response to the proximity alert sent to the wireless communication device, an express authorization communication authorizing sending of an alert to the selected entity advising the selected entity of the impending arrival of the wireless communication device to the selected entity; and
send an alert to the selected entity only in response to:
the determination act; and
receiving the express authorization communication from the wireless communication device, while the wireless communication device is en route to and approaching the selected entity, thereby giving the user an option to not send an alert to the selected entity.

17. The system of claim 16, wherein the computing device is further programmed to:
determine a speed at which the wireless communication device is moving in relation to the known location;
determine an estimated time of arrival of the wireless communication device to the known location, based on the present location and the speed of the wireless communication device; and
send the proximity alert to the selected entity at a time determined as a function of the estimated time of arrival at the known location, so that the proximity alert notifies the selected entity of the estimated arrival time of the user at least sufficient for the preparation time needed by the selected entity.

18. The system of claim 16, wherein the computing device is further programmed to send the proximity alert to the wireless communication device based on an estimated time it would take for the user to arrive at the known location at a current speed of the wireless communication device.

19. The system of claim 16, wherein the computing device is further programmed to:
determine an amount of time needed for the selected entity to prepare for a visit by the user; and
send the proximity alert to the user when the estimated travel time is equal to or less than a time for preparation so that the selected entity is alerted in time sufficient for the preparation time.

20. The system of claim 16, wherein the alert sent to the selected entity is the proximity alert.

* * * * *